(12) United States Patent
Kaszynski et al.

(10) Patent No.: US 9,396,194 B2
(45) Date of Patent: Jul. 19, 2016

(54) DATA PROCESSING

(75) Inventors: Marcin Kaszynski, Warsaw (PL); Grzegorz Kapkowski, Grodzisk Mazowieck (PL); Marek M. Stepniowski, Warsaw (PL)

(73) Assignee: ARRIS Enterprises, Inc., Suwanee, GA (US)

( * ) Notice: Subject to any disclaimer, the term of this patent is extended or adjusted under 35 U.S.C. 154(b) by 593 days.

(21) Appl. No.: 13/540,776

(22) Filed: Jul. 3, 2012

(65) Prior Publication Data
US 2014/0012818 A1    Jan. 9, 2014

(51) Int. Cl.
| | |
|---|---|
| G06F 7/00 | (2006.01) |
| G06F 17/00 | (2006.01) |
| G06F 17/30 | (2006.01) |
| H04N 21/2665 | (2011.01) |
| H04N 21/235 | (2011.01) |
| H04N 21/278 | (2011.01) |
| H04N 21/81 | (2011.01) |
| H04N 21/84 | (2011.01) |
| G06K 9/00 | (2006.01) |
| G06K 9/62 | (2006.01) |

(52) U.S. Cl.
CPC ...... *G06F 17/30038* (2013.01); *G06F 17/3082* (2013.01); *G06K 9/00979* (2013.01); *G06K 9/6218* (2013.01); *G06K 9/6253* (2013.01); *H04N 21/2353* (2013.01); *H04N 21/2665* (2013.01); *H04N 21/278* (2013.01); *H04N 21/8133* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 8,073,862 B2 | 12/2011 | Kamen | |
| 2006/0248058 A1 | 11/2006 | Feng | |
| 2009/0307201 A1 | 12/2009 | Dunning et al. | |
| 2010/0169369 A1* | 7/2010 | Wang | G06F 17/30038 707/770 |
| 2010/0293579 A1 | 11/2010 | Kulick et al. | |
| 2011/0283232 A1* | 11/2011 | Jordan | H04N 5/44543 715/810 |
| 2011/0289083 A1 | 11/2011 | Fisher | |
| 2012/0148214 A1* | 6/2012 | Black | 386/241 |
| 2012/0189212 A1* | 7/2012 | Ren et al. | 382/218 |
| 2012/0221498 A1 | 8/2012 | Kaszynski et al. | |

FOREIGN PATENT DOCUMENTS

| | | |
|---|---|---|
| WO | 2012112855 A1 | 8/2012 |
| WO | 2012122400 A1 | 9/2012 |

OTHER PUBLICATIONS

PCT Search Report & Written Opinion, RE: Application #PCT/US2013/049389, dated Oct. 30, 2013.

\* cited by examiner

*Primary Examiner* — Tuan A Pham
(74) *Attorney, Agent, or Firm* — Thomas A. Ward

(57) ABSTRACT

A system for processing correlated metadata is provided, the metadata being programmatic metadata relating to one or more episodes of a television show. Mappings, or correlations, between chunks of the metadata that originated from a particular data source and the metadata clusters are determined and displayed on a graphical user interface. Using this display, a user can detect inconsistencies in the correlated metadata. An inconsistency may be an incorrect mapping, the mapping of more than one of the metadata chunks that originated from the same data source to the same metadata cluster, or that one or more of the metadata chunks have not been mapped to a metadata cluster. The mappings can be edited to remove detected inconsistencies.

15 Claims, 7 Drawing Sheets

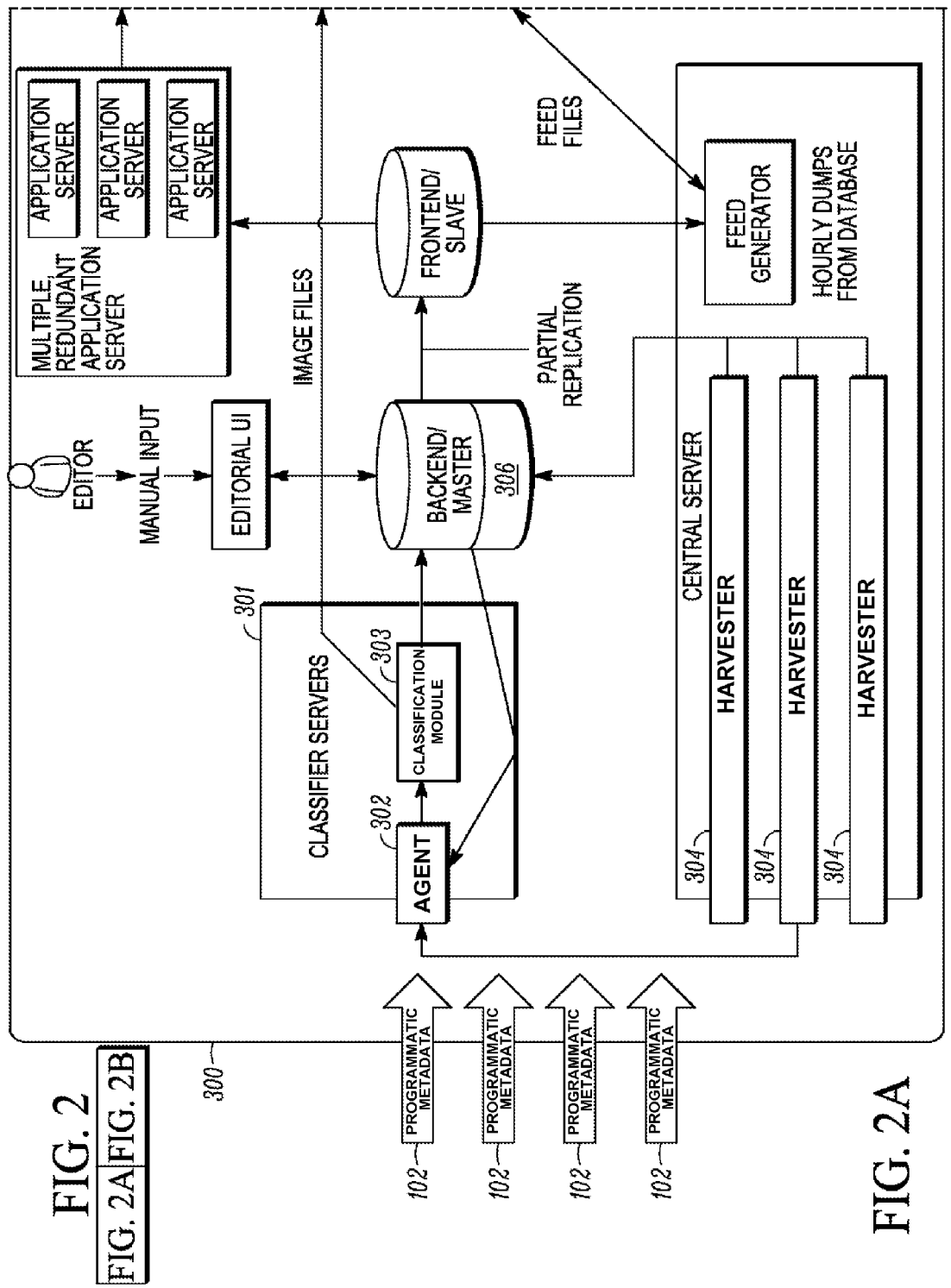

| CANONICAL LIST OF EPISODES | DATA SOURCE 1 | DATA SOURCE 2 | DATA SOURCE 3 | DATA SOURCE 4 |
|---|---|---|---|---|
| SERIES 1 EPISODE 1 | X | X | X | X |
| SERIES 1 EPISODE 2 | X | X | X | X |
| SERIES 1 EPISODE 3 | X | X | XX | XX |
| SERIES 1 EPISODE 4 | X | X | | |
| SERIES 1 EPISODE 5 | X | | X | X |
| SERIES 1 EPISODE 6 | X | X | X | X |
| SERIES 2 EPISODE 1 | X | X | X | |

FIG. 5

DATA PROCESSING

FIELD OF THE INVENTION

The present invention is related generally to correlating metadata from a plurality of different sources.

BACKGROUND OF THE INVENTION

Multimedia content (e.g., multimedia presentations such as movies, TV programs, etc.) may be sourced by a consumer of that content from a plurality of different sources. The terminology "multimedia content" is used herein to refer to data representing literary, lyrical, or viewable content, including television or videographic content such as recorded television data, DVD data, digital picture data, and the like. Consumers of such multimedia content may demand, in addition to information that identifies the movie or TV program, further information about the multimedia content. This further information may, for example, include cast and crew information, episode and season information, etc. This further information is herein referred to as "programmatic metadata."

There are several sources for programmatic metadata. These sources may provide programmatic metadata to anyone, e.g., consumers, providers of entertainment services, etc. Example sources of programmatic metadata include commercial aggregators of appropriate information, sources that mine the appropriate information from, for example, web sites, etc.

Typically, a single source of programmatic metadata does not provide all of the programmatic metadata desired by consumers or providers of entertainment. Thus, there tends to be a need to aggregate sources of metadata. However, each of the different sources of programmatic metadata may have incomplete or ambiguous data about multimedia content. Also, different sources of programmatic metadata may have conflicting data about multimedia content.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIGS. 2a and 2b together form a schematic illustration of a production cluster of the network of FIG. 1;

FIG. 5 is a schematic illustration of an example of a table constructed during the process of FIG. 4.

DETAILED DESCRIPTION

Figure 1:
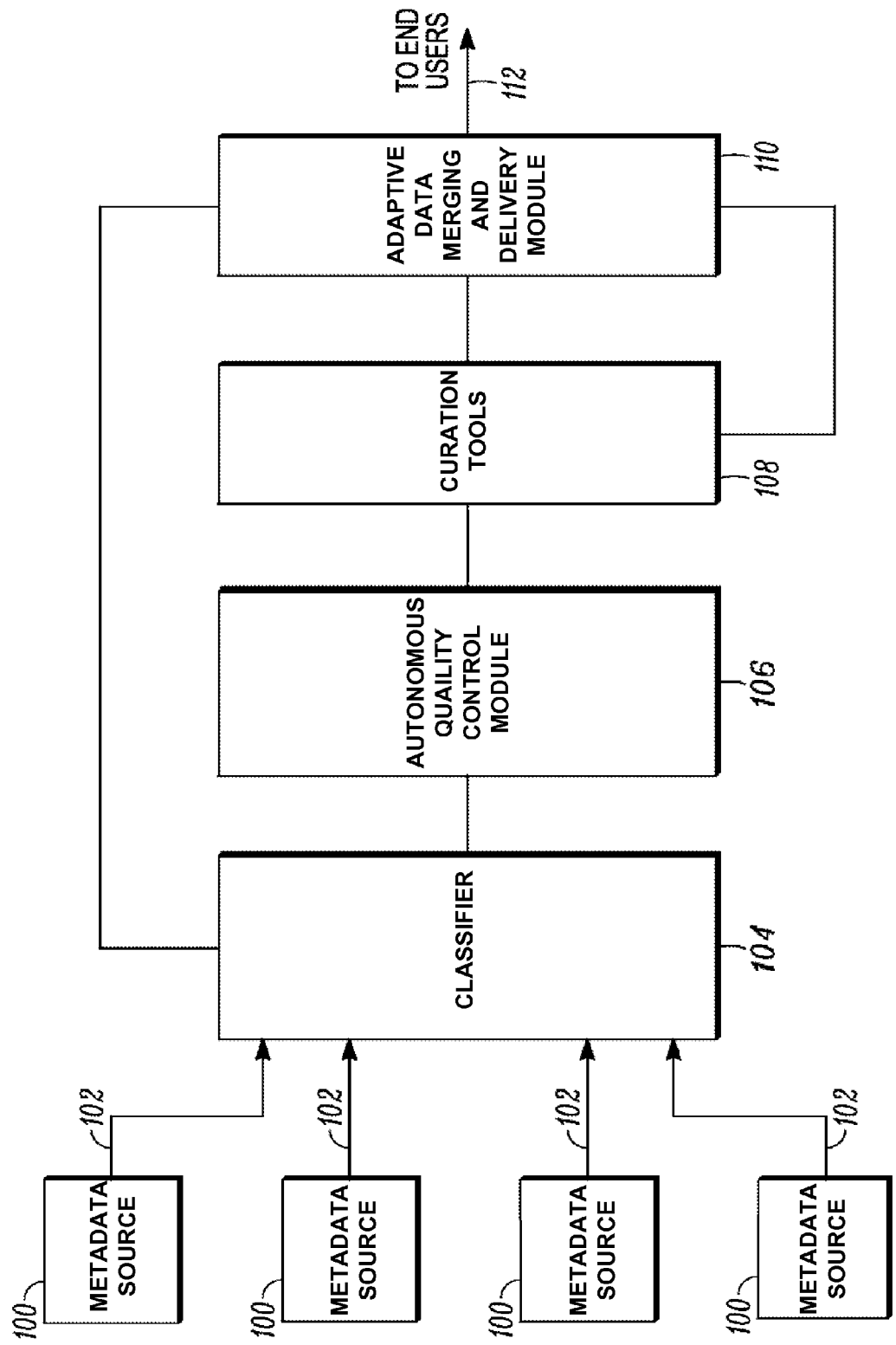
FIG. 1 shows an exemplary system for mapping programmatic metadata from a number of different sources to a single identification.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

Embodiments of the invention include methods and apparatus for processing correlated metadata (e.g., programmatic metadata relating to one or more episodes of a television show). The correlated metadata may comprise one or more clusters of metadata. Each cluster may relate to a respective episode of the television show. Each metadata cluster may have been formed using metadata that originated from a plurality of different data sources. The metadata from the different data sources may relate to the same multimedia content. Mappings, or correlations, between chunks of the metadata that originated from a particular data source and the metadata clusters may be determined and displayed, e.g., on a graphical user interface. Using this display, a user (i.e., a human operator) may detect inconsistencies in the correlated metadata. An inconsistency may be the mapping of more than one of the metadata chunks that originated from the same data source to the same metadata cluster. Also, an inconsistency may be that one or more of the metadata chunks have not been mapped to a metadata cluster. The mappings may then be edited so as to remove detected inconsistencies. This editing may (e.g., if it is detected that more than one of the metadata chunks that originated from the same data source have been mapped to the same metadata cluster) comprise changing the mappings of the metadata chunks to the metadata clusters such that each of the metadata chunks that originated from the same data source is mapped to a different metadata cluster. Also, the editing may (e.g., if it is detected that a metadata chunk has not been mapped to a metadata cluster) comprise mapping that metadata chunk to a metadata cluster. This editing may also comprise mapping a metadata chunk to a cluster if the editor decides it was mapped to an incorrect one. The correlated programmatic metadata with the inconsistencies removed may be provided for use by, e.g., a multimedia content provider, a service provider, or a consumer of the multimedia content.

Apparatus for implementing any of the below described arrangements, and for performing the method steps described below, may be provided by configuring or adapting any suitable apparatus, for example one or more computers or other processing apparatus or processors, or providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM, etc., or any combination of these or other storage media.

It should be noted that certain of the process steps depicted in the flowcharts described below may be omitted or such process steps may be performed in differing order to that presented below and shown in the figures. Furthermore, although all the process steps have, for convenience and ease of understanding, been depicted as discrete temporally-sequential steps, nevertheless some of the process steps may in fact be performed simultaneously or at least overlapping to some extent temporally.

Aspects of the present invention are described with reference to the accompanying drawings, beginning with FIG. 1. FIG. 1 shows an exemplary system for mapping programmatic metadata from a number of different sources to a single identification and for rendering a unified TV- and movie-data feed for end users. The system shown in FIG. 1 is described in more detail in U.S. Provisional Patent Application 61/444,721, filed on 19 Feb. 2011, which is incorporated herein by reference. Firstly, from a plurality of different programmatic metadata sources 100 (which may include any known commercial metadata sources), programmatic metadata 102 (in their original formats) may be retrieved by a classifier 104 or sent from the data sources 100 to the classifier 104. The classifier 104 is used to perform a classification process to split the retrieved programmatic metadata into their constituent elements (e.g., images, descriptions, air-date, links, etc.) and to map those constituent elements to a single identity using a clustering method. An autonomous quality control module 106 may then perform an autonomous quality control process.

Some embodiments provide a graphical display of the constituent metadata elements from various sources in, for example, a grid-like format. Using such a graphical display, a human may then use curation tools 108 to drag elements from a source into a correct category as defined by other sources. This manual curation ability allows humans to set trust values for entertainment metadata elements from individual metadata sources by an algorithmic process. An adaptive data merging and delivery module 110 may then adaptively merge algorithmic and manually curated data into a single dataset. Human input may be used to enhance the process of merging the data because an algorithmic process recognizes patterns from the implicit actions of the manual processes. The classification process may also learn improved pattern recognition from the explicit actions of the manual processes. The processed programmatic metadata 112 are then provided for use by end users.

Aggregating content of disparate data formats across various data sources may be carried out by retrieving the content from memory locally, by downloading the content from a network location, or by any other way of retrieving content that will occur to those of skill in the art.

The system of FIG. 1 may be implemented in any appropriate network, for example, the network described in more detail in U.S. Provisional Patent Application 61/444,721. The network may include servers that render the entertainment metadata. Entertainment metadata may be rendered as audio by playing the audio portion of the media content or by displaying text, video, and any images associated with the media data on a display screen of a media device.

Figure 2B:
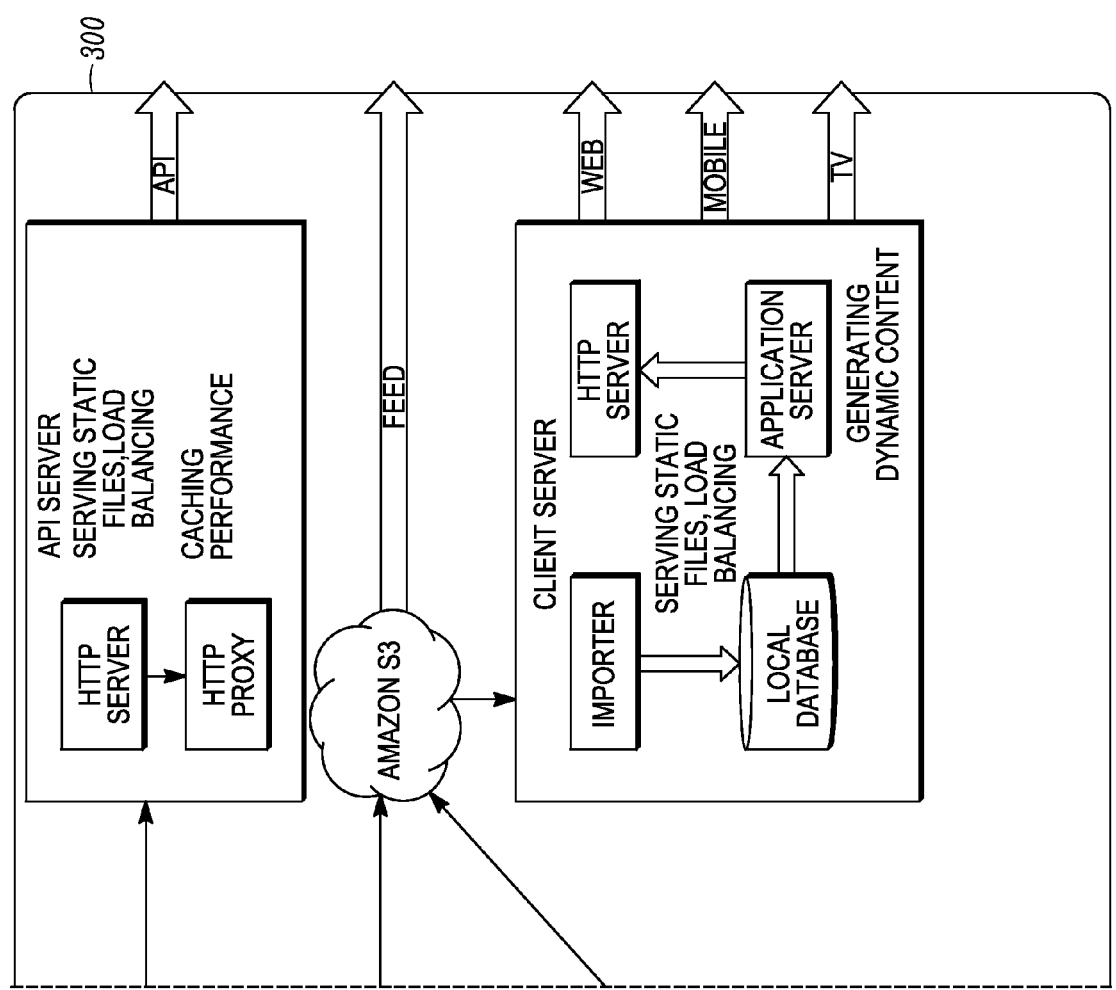

FIG. 2 (which comprises FIGS. 2a and 2a) is a schematic illustration of a production cluster 300 of the network. The production cluster 300, and it components, are described in more detail in U.S. Provisional Patent Application 61/444,721.

The production cluster 300 comprises inter alia multiple classifier servers 301 (each classifier server comprising one or more agents 302 and one or more classification modules 303), a plurality of harvesters 304, and a harvester table repository 306. Certain functionalities of these and other components of the production cluster 300 are described in more detail in U.S. Provisional Patent Application 61/444,721. The classifier servers 301 may each run a classification process. Also, the classifier server 301 may perform the function of the classifier 104 of FIG. 1, i.e., the classifier servers 301 may perform a classification process to split programmatic metadata into constituent elements and to map those constituent elements to a single identity using a clustering method.

Figure 3:
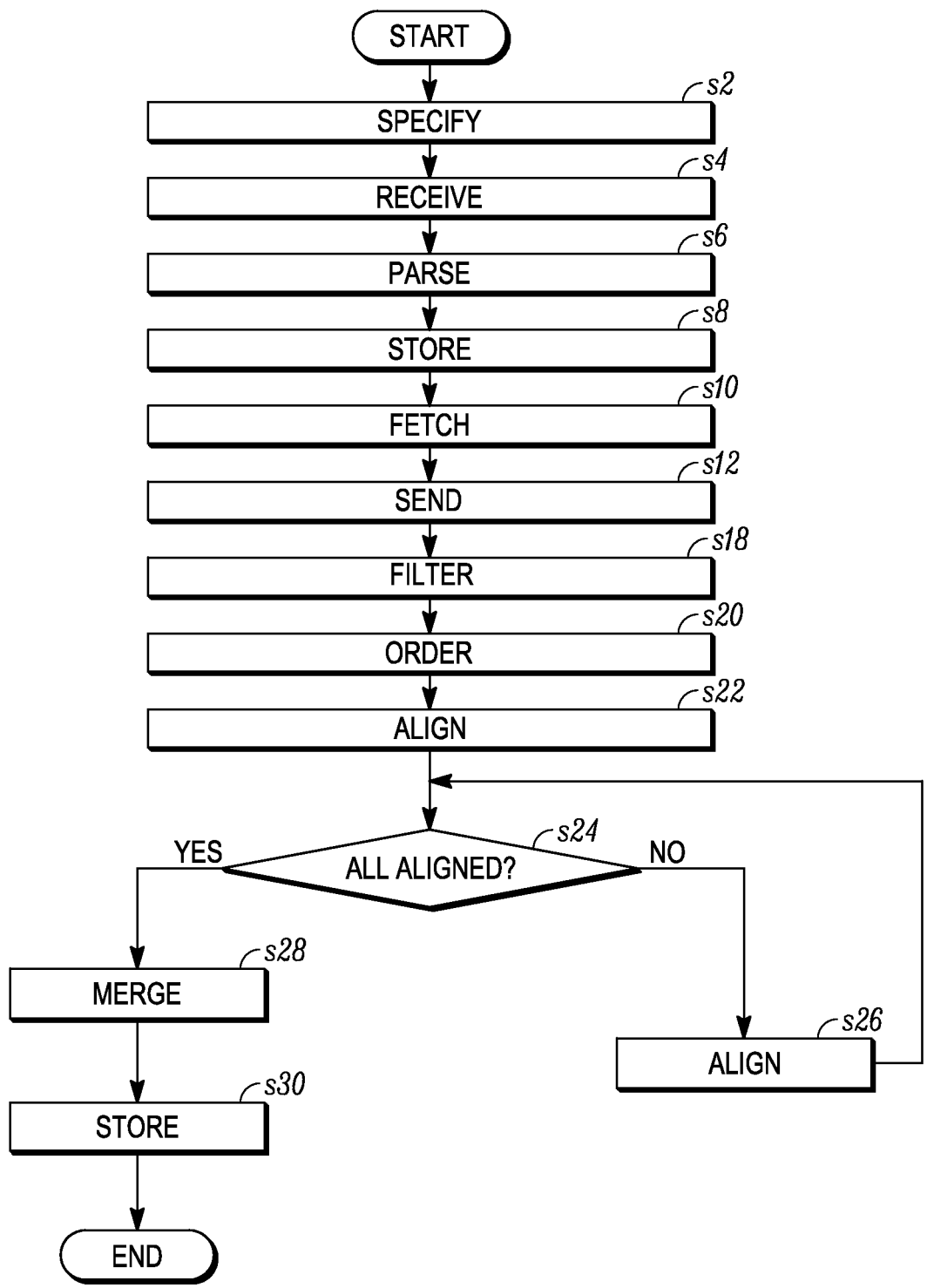
FIG. 3 is a process flow chart showing certain steps of an embodiment of a method for correlating metadata for episodes within a season of a TV show.

FIG. 3 is a process flow chart showing certain steps of an embodiment of a method for creating complete and consistent metadata for episodes within a season (i.e., series) of a TV show. The method of FIG. 3 includes performing a classification process to split programmatic metadata into constituent elements and mapping those constituent elements to a single identity using a clustering method. Thus, the method of FIG. 3 may be implemented by the agents 302, the classification modules 303, the harvesters 304, and the harvester table repository 306.

At step s2, an order for the sources 100 of the programmatic metadata 102 is specified. The sources 100 are ordered based on their reliability. For example, the sources 100 may be ordered from the source that is deemed to be the most reliable to the source 100 that is deemed to be the least reliable. The assessment of the reliability of a source 100 may be based on any appropriate heuristic, for example human judgment.

At step s4, programmatic metadata 102 are received by the harvesters 304 from the data sources 100. Each harvester 304 receives metadata 102 from one particular data source 100. In this embodiment, the metadata 102 received by the harvesters 304 from the data sources 100 relate to one or more episodes of one or more TV shows.

At step s6, the harvesters 304 pre-process (by parsing) the received data. This advantageously tends to avoid loading large amounts of data into memory. Each harvester 304 is assigned to a specific source 100. This is because, in order to parse metadata from a source 100, a harvester 304 assigned to that source 100 uses a priori knowledge of the way that data are organized by that source 100. Each harvester 304 may be a Python class configured to read programmatic metadata 102 from the source 100 to which it is assigned and to parse that programmatic metadata 102 into separate chunks of data. Each chunk of data may specify one or more attributes of the multimedia asset, e.g., the title, release year, etc. If the programmatic metadata 102 relates to a series or season of a TV show comprising a plurality of episodes of that TV show, the metadata 102 from a source 100 may be parsed into chunks such that each chunk contains all the metadata from that source that relate to a particular episode of that series. The harvesters 304 may use a schema that makes querying by an agent 302 easy. At the same time, the harvesters 304 may use a schema that keeps the metadata in a format close to that provided by the sources 100. This tends to allows for changes to be made in the agent code without having to re-parse the feeds. In other embodiments, base harvester classes that make adding new sources easier may be used. Examples include formats such as Media RSS, video sitemaps, CSV, generic XML, etc.

At step s8, the parsed data (i.e., the data chunks) are stored by the harvesters 304 in the harvester tables repository 306, i.e., a database. Thus, after metadata 102 from each of the sources 100 have been read, parsed, and stored by the harvesters 304, the harvester tables repository 306 contains a set of chunks of data. If the programmatic metadata relate to a series or season of a TV show comprising a plurality of episodes of that TV show, each episode of the TV show that is referred to in the programmatic metadata relates to at least one chunk of data.

At step s10, the classifier servers 301 perform a "fetch" process to retrieve from the harvester tables repository 306 some or all of the stored metadata chunks.

As described in more detail in U.S. Provisional Patent Application 61/444,721, programmatic metadata 102 from each the sources 100 may be wrapped with an abstraction layer, represented by an agent 302. An agent 302 can be implemented as a Python callable that returns an iterable of Python dict, a core Python dictionary class. From the point of view of the rest of the system, an agent 302 may be considered to be "a black box." Arguments (i.e., labels) that may be used identify a multimedia asset (e.g., title, release year, whether it is a movie or a series) may be provided by the sources 100, and an agent 302 may return dictionaries conforming to a specific format and containing metadata identifying an agent 302. An agent 302 may be responsible for finding the right data, e.g., in case the source 100 stores information about a multimedia asset under a different title. Preferably, this fetch process takes less than 12 hours.

This fetch process may be performed by the multiple classifier servers 301. The classifier processes performed by the classifier servers 301 are such that programmatic metadata may be retrieved by agents 302 in parallel. When the fetch process begins, the list of all titles (and other information relevant for the classifier processes such as release years, directors, languages, etc.) is sent to a queue. The classifier processes that perform the fetch process may be normal Python programs that take a package from the queue, collect all necessary information, process it, and store the results. The classifier processes then take another package from the queue. By increasing the number of classifier processes involved, the fetch process can be accelerated in an almost linear fashion. The classifier processes may operate so that they do not share information with each other. Thus, in effect, multiple classifier processes perform independent fetch processes without blocking data or using a lot of database transactions.

At step s12, the metadata chunks retrieved by the agents 302 are sent to the classification module 303.

At step s18, for each source 100, the classification module 303 filters the programmatic metadata chunks from that source 100. This is performed so that the programmatic metadata from that source 100 relates to the episodes of a single TV show. For example, for each of the sources 100, the classification module 303 may filter the metadata chunks from each of the sources to retain only the metadata chunks that relate to a particular TV show.

At step s20, for each source 100, the classification module 303 orders the filtered metadata chunks from that source 100. This is performed so that the chunks of metadata from that source 100 are placed in episode order. For example, the data chunks may be ordered so that the data chunk relating to a first episode of a season of the TV show appears first, followed by the data chunk that relates to the next episode, and so on, i.e., the metadata chunks may be ordered such that the first data chunk refers to series 1, episode 1, of the TV show, the second data chunk refers to series 1, episode 2, of the TV show, the third data chunk refers to series 1, episode 3, of the TV show, and so on.

At step s22, using the metadata from the most reliable source 100 (the reliability of the data sources having been specified at step s2) and the next (i.e., second most reliable source) a modified Smith-Waterman algorithm is performed. The Smith-Waterman algorithm may advantageously be modified in a simple way to allow matching of items (i.e., the alignment of sequences of items) with complex values. The Smith-Waterman algorithm is used to perform local sequence alignment, i.e., to align, the filtered and ordered data chunks from the two most reliable metadata sources 100. The Smith-Waterman algorithm comprises forming a matrix of values of a similarity metric, the (i,j)th value being indicative of the similarity between the ith data chunk from the most reliable data source and the jth data chunk from the second most reliable data source. The similarity metric may be any appropriate metric. For example, the similarity metric may be based upon a comparison between one or more attributes (e.g., director, cast, first aired date, etc.) of the episode as specified in the metadata from the most reliable source and those attributes of the episode as specified in the metadata from the second most reliable source. The Smith Waterman algorithm identifies patterns of high similarity values within the formed matrix. If the filtered and sorted metadata from the two sources are already aligned and complete, then the matrix will tend to show large values along the leading diagonal. If the filtered and sorted metadata from the two sources are misaligned, then the diagonal may be translated within the matrix. The translation may be used to align (or match) episodes from the two sources. If metadata corresponding to a particular episode are missing from the metadata from one or both sources, a "place holder" can be inserted into one of the sources to align the episodes. If there is no identifiable pattern or the values of the similarity metric within the matrix are all low, then it may be inferred that the data sets from the two different sources refer to different TV shows.

The output of the Smith-Waterman algorithm performed at step s22 is the aligned metadata chunks from the two most reliable metadata sources, hereinafter referred to as the "aligned metadata."

At step s24 it is determined whether or not filtered and sorted metadata from each of the sources 100 have been aligned with the aligned metadata.

If at step s24 it is determined that filtered and sorted metadata from each of the sources 100 has not yet been aligned with the aligned metadata, then the method proceeds to step s26.

If at step s24 it is determined that filtered and sorted metadata from each of the sources 100 have been aligned with the aligned metadata, the method proceeds to step s28, which is described in more detail below after the description of step s26.

At step s26, sorted and filtered metadata chunks from the next most reliable data source 100 (that have not already been aligned with the aligned metadata) are aligned with the current aligned metadata. This alignment of the sorted and filtered metadata chunks from the next most reliable data source 100 and the current aligned metadata is performed using the modified Smith-Waterman algorithm, as performed at step s22. Thus, the aligned metadata are updated to include the metadata chunks from the next most reliable data source 100.

After step 26, the method proceeds back to step s24. Thus, the method continues until the programmatic metadata from each of the sources (that have been filtered and ordered) have been aligned with the metadata chunks from each of the other sources. After the metadata chunks from each of the sources (that have been filtered and ordered) have been aligned with the metadata from each of the other sources, the method proceeds to step s28.

Thus, after having performed step s26, one or more clusters of metadata are formed. Each cluster of metadata may comprise those metadata chunks that are aligned together. Each cluster of data chunks contains all those data chunks across one or more data sources that correspond to the same episode of the TV show.

At step s28, for each cluster, the data chunks within that cluster are "merged" (i.e., the data are consolidated). For example, duplicate information expressed by the data chunks within a cluster may be deleted. Thus a consolidated version (or so-called "canonical" form) of each cluster is formed. Each consolidated cluster of data chunks tends to relate to a respective episode of the TV show (that the metadata were filtered to select data chunks for). The data in each cluster advantageously tend to be consistent, despite the cluster containing data chunks from the plurality of different sources 100.

At step s30, after the metadata from each of the sources 100 (that have been filtered and ordered) have been aligned with the metadata from each of the other sources 100, the aligned metadata are stored by the classification module 303.

Thus, the stored clusters of metadata form a list of episodes of the series of the TV show. This list is hereinafter referred to as the "canonical list of episodes."

Thus, a method for creating complete and consistent metadata for episodes within a season (i.e., series) of a TV show is provided.

The above described system and method advantageously tend to produce consistent and complete metadata for episodes within a series or season of a given TV show. The above described system and method advantageously tend to provide a solution to a problem of matching programmatic metadata from different sources that provide metadata relating to one or more seasons or series of TV shows, where the individual programs are episodes within a series or seasons of a given TV show.

Different metadata sources 100 may treat some "episodes" of a TV show differently from other metadata sources 100. For example, a multi-part episode of a TV show may be treated as a single episode by one metadata source 100 but as multiple episodes by another metadata source 100. This may cause mismatching (i.e., misalignment) or mislabeling of episodes of the TV show. What is now described is an example (optional) method for (automatically) identifying and correcting the mismatching or the labeling of episodes that may be caused by metadata sources 100 treating some episodes of a TV show differently from how other metadata sources 100 treat them.

In this embodiment, the method of identifying and correcting the mismatching or mislabeling of episodes is used in conjunction with the method for creating a canonical list of episodes described above with reference to FIG. 3. However, in other embodiments, the method of identifying and correcting the labeling of episodes may be used to correct the output of a different method for producing consistent metadata.

Figure 4:
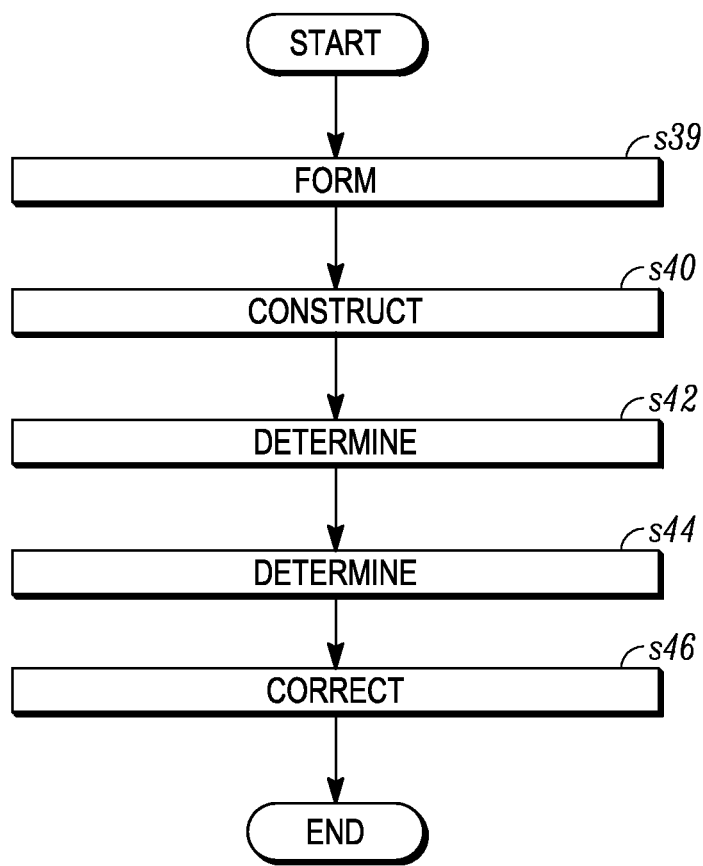
FIG. 4 is a process flow chart showing certain steps of a process of identifying and correcting inconsistencies in correlated metadata.

FIG. 4 is a process flow chart showing certain steps of a process of identifying and correcting mismatching or mislabeling of episodes in a canonical list of episodes.

At step s39, a canonical list of episodes of a TV show is formed. In this embodiment, the process of FIG. 3 is performed to form the canonical list of episodes. However, in other embodiments a different process may be performed.

At step s40, a table is constructed. This may be performed by the classification module 303. This table shows, for each of the data sources 100, to which episode in the canonical list of episodes the metadata chunks from that source have been matched (or aligned).

FIG. 5 is a schematic illustration of an example of the table that is constructed at step s40. Each X in the table represents a data chunk. The column that an X is in indicates the data source 100 from which that data chunk originated. The row that an X is in indicates the episode in the canonical list to which that data chunk has been matched (aligned).

At step s42, for each source 100, it is determined whether more than one data chunk from that data source 100 has been matched to a single episode from the canonical list of episodes (i.e., whether more than one data chunk from that source is within a single cluster). For example, in FIG. 5, two data chunks from each of Data Source 3 and Data Source 4 have been mapped to Series 1, Episode 3, of the canonical list of episodes. This step may be performed by the classification module 303, i.e., automatically.

At step s44, for each source 100, it may be determined whether any metadata chunks from that source 100 have not been matched to an episode from the canonical list. Instead of or in addition to this, at step s44 it may be determined, for each source 100, whether there is an episode in the canonical list to which no metadata chunk from that source 100 has been matched. This step may be performed by the classification module 303, i.e., automatically.

At step s46, the inconsistencies (which may be thought of as errors) determined at step s42 or step s44 are corrected. This may be done in any appropriate way. For example, if two data chunks from a single source 100 have been matched to a single episode from the canonical list of episodes, one of those data chunks may be matched (e.g., by the classification module 303, i.e., automatically) to a different episode from the canonical list of episodes. Also for example, if a metadata chunk from a certain source 100 has not been matched to an episode from the canonical list, that metadata chunk may be matched to an episode from the canonical list. For example, in FIG. 5, one of the two data chunks from Data Source 3 that has been matched to Series 1, Episode 3, of the canonical list of episodes may be matched to Series 1, Episode 4, of the canonical list of episodes. Likewise, in FIG. 5, one of the two data chunks from Data Source 4 that has been matched to Series 1, Episode 3, of the canonical list of episodes may be matched to Series 1, Episode 4, of the canonical list of episodes. This step may be performed by the classification module 303.

Thus, a method of identifying and correcting the mismatching or mislabeling of episodes is provided.

An advantage provided by the above described method of identifying and correcting mismatching or mislabeling of episodes is that consistent and complete metadata for episodes within a series or season of a given TV show can be formed (automatically) even if different metadata sources 100 may treat or label some episodes of a TV show differently from other metadata sources 100.

Furthermore, the above described table which shows, for each of the data sources 100, to which episode in the canonical list of episodes the metadata chunks from that source 100 have been matched is an advantageously simple representation of the aligned metadata.

Figure 6:
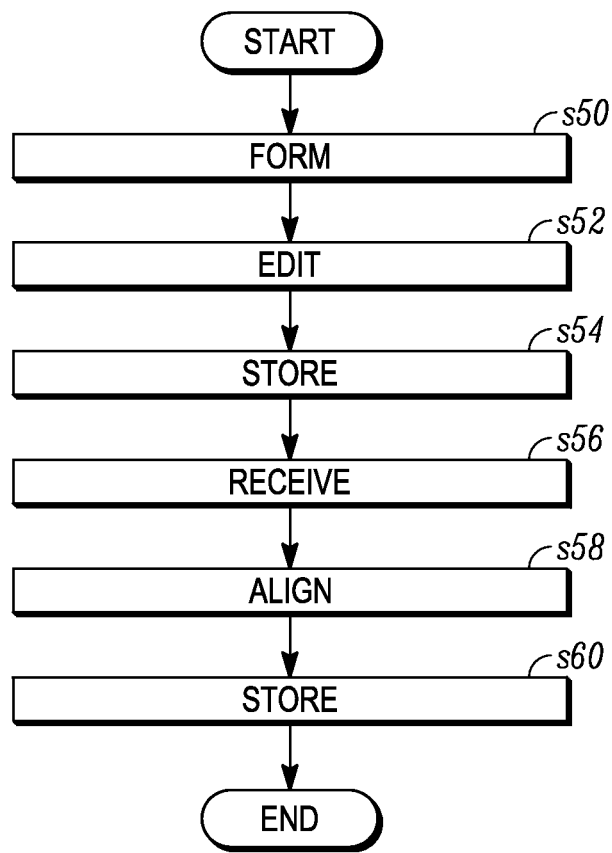
FIG. 6 is a process flow chart showing certain steps of a process in which new metadata from a new source are correlated with the correlated metadata.

What is now described, with reference to FIG. 6, is an example (optional) method in which aligned metadata may be manually corrected and in which new metadata items may be aligned.

In this embodiment, the method of FIG. 6 comprises performing the method for creating a canonical list of episodes described above with reference to FIG. 3. However, in other embodiments, the method of FIG. 6 may be used to correct the output of a different method for producing a canonical list of episodes.

At step s50, a set of consistent metadata for episodes within a season (i.e., series) of a TV show is formed. In this embodiment, the process of FIG. 3 is performed to form the set of complete and consistent metadata for episodes within season of a TV show. However, in other embodiments a different process may be performed.

At step s52, a process of editing the alignment of metadata is performed. This process may be performed manually in any appropriate way. For example, the canonical list of episodes (determined at step s50) may be displayed (to an editor, e.g., a human editor on a visual interface) alongside all metadata chunks from each of the data sources 100. The editor may then, using the visual interface, edit, change, modify, correct, etc. the alignment of metadata from one or more sources 100 with the metadata from one or more different sources 100 or with the canonical list of episodes. The canonical list of episodes and the aligned metadata chunks from the different sources 100 may be displayed to the editor in a table. Data chunks that have not yet been aligned with the canonical list of episodes, or with other metadata chunks, (e.g., new metadata items) may be flagged as such so that the editor may align them.

The output of step s52 is hereinafter referred to as the "updated aligned metadata."

The changes made (at step s52) by the editor to the alignment of the programmatic metadata chunks are used to align new or updated metadata that are received from one or more of the data sources 100 after the editor has made his corrections. For example, steps s56 through s60 (described in more detail below) describe a process of aligning new or updated metadata that are received from one or more of the data sources 100 after the editor has made his corrections with the updated aligned metadata. This process (i.e., steps s56 through s60) may be performed before the human editor again edits or corrects the metadata alignment.

Thus, for example, new or updated metadata for a TV show may be received by the production cluster 300 and aligned with the current updated aligned metadata every few hours (or with a different, relatively short frequency). The human operator may edit this metadata alignment every couple of days or every week (or with a different, relatively long frequency).

At step s56, new programmatic metadata (i.e., metadata that has not previously been processed) or updated programmatic metadata are received by the production cluster 300. The new or updated programmatic metadata relate to the same TV show that the updated aligned metadata (produced at step s52) relate to.

At step s58, the new programmatic metadata is aligned with the updated aligned metadata. This alignment may be performed by filtering and ordering the new metadata and aligning the filtered, ordered new metadata, e.g., using the modified Smith-Waterman algorithm. This step may be performed by the classification module 303. In this embodiment, the most recent changes made to the alignment of metadata with the canonical list of episodes (at step s52) are taken into account when the new or updated metadata are aligned with the canonical list of episodes. For example, if, at step s52, the editor changed metadata relating to the TV show from a particular source, then at step s58 new or updated metadata relating to the TV show from the same particular source would be changed in the same way during alignment. Weighted comparisons between one or more attributes (e.g., episode identifiers, titles, etc.) of the new or updated metadata and the updated aligned metadata may be determined during the alignment process.

The output of step s58 is hereinafter referred to as the "new aligned metadata."

At step s60, the new aligned metadata may be stored or published (or made available in some other way to users of that data, e.g., multimedia content providers). The new aligned metadata may be further edited, changed, modified, or corrected, e.g., as performed at step s52. After a number of iterations of steps s56 through s60, the alignment of the metadata may be re-edited by the human editor as described above with reference to step s52 through 54.

Thus, a process in which aligned metadata that have been corrected are used in the alignment of further metadata is provided.

In addition to those advantages mentioned above, the method of FIG. 6 advantageously tends to provide that any edits, changes, modifications, corrections, etc. of the aligned metadata may be taken into account when processing new programmatic metadata (e.g., for a further data source 100). This tends to reduce the chances that the new aligned metadata need to be further edited, changed, modified, or corrected in some way.

In view of the many possible embodiments to which the principles of the present invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

We claim:

1. A method of processing correlated metadata, the correlated metadata comprising a set of one or more clusters of metadata, each cluster comprising one or more metadata chunks, each metadata chunk being a chunk of metadata that originated from a single data source, each metadata chunk within a cluster being from a data source different from the data sources from which the other metadata chunks within that cluster originate, the method comprising:
    determining, by one or more processors, mappings between the metadata clusters and one or more of the metadata chunks, wherein the metadata is programmatic metadata relating to episodes of television shows, wherein the metadata clusters include the metadata relating to a specific one of the television shows, and wherein the metadata chunks make up portions of the metadata cluster that can originate from different media sources;
    displaying to a human operator, using a graphical user interface operatively connected to the one or more processors, the determined mappings;
    editing, by the human operator using the graphical user interface, a mapping between one or more metadata chunks and one or more of the metadata clusters such that a detected inconsistency in the correlated metadata is removed;
        wherein an inconsistency comprises:
            an incorrect mapping of a metadata chunk to a metadata cluster;
            a mapping of more than one metadata chunk originating from the same data source to the same metadata cluster; and
            one or more of the metadata chunks not being mapped to a metadata cluster, and
        wherein when the user detects that one or more of the metadata chunks have not been mapped to a metadata cluster, the editing comprises moving, by the human operator, a digital representation of the metadata chunk that has not been mapped to a metadata cluster from a position on the graphical user interface that corresponds to not being mapped to a metadata cluster to a position on the graphical user interface that corresponds to being mapped to a metadata cluster;
    receiving, by the one or more processors, further metadata from a further data source, the further metadata relating to the same multimedia content as the correlated metadata;
    dividing, by the one or more processors, the metadata from the further source into one or more chunks of that metadata; and
    performing, by the one or more processors, an alignment process to align the metadata chunks that originated from the further data source with the correlated metadata having the detected inconsistency removed, thereby correlating the further metadata and the correlated metadata having the detected inconsistency removed.

2. A method according to claim 1 wherein when the inconsistency is an incorrect mapping of a metadata chunk to a metadata cluster, the editing comprises correcting the incorrect mapping.

3. A method according to claim 1 wherein when the inconsistency is that more than one metadata chunk originating from the same data source has been mapped to the same metadata cluster, the editing comprises changing the mappings of the metadata chunks to the metadata clusters such that each of the metadata chunks that originated from the same data source is mapped to a different single metadata cluster.

4. A method according to claim 1 wherein when the inconsistency is that a metadata chunk has not been mapped to a metadata cluster, the editing comprises mapping that metadata chunk to a metadata cluster.

5. A method according to claim 1 wherein when the user detects the mapping of more than one metadata chunk originating from the same data source to the same metadata cluster, then editing comprises moving, by the human operator, a digital representation of a metadata chunk from a first position on the graphical user interface to a second position on the graphical user interface;
   wherein the first position is such that an element positioned at the first position is mapped to the metadata cluster to which more than one of the metadata chunks were mapped; and
   wherein the second position is such that an element positioned at the second position is mapped a different metadata cluster to the metadata cluster to which more than one of the metadata chunks were mapped.

6. A method according to claim 1 wherein each of the clusters has been consolidated to delete duplicate information.

7. A method according to claim 1 wherein the metadata from a data source specify one or more attributes selected from the group of attributes consisting of: episode information, series information, cast information, crew information, and broadcast information.

8. A method according to claim 1 further comprising providing, for use by an entity remote from the one or more processors, the correlated metadata having the detected inconsistency removed.

9. A method according to claim 1 wherein the alignment process comprises performing a Smith-Waterman algorithm modified to allow matching of items with complex values.

10. A method according to claim 1 further comprising:
    displaying, by the one or more processors on the graphical user interface, a mapping between the metadata chunks that originated from the further data source and the correlated metadata having the detected inconsistency removed; and
    editing, by the human operator, the mapping between the metadata chunks that originated from the further data source and the correlated metadata having the detected inconsistency removed, so as to remove a detected further inconsistency.

11. Apparatus for processing correlated metadata, the correlated metadata comprising a set of one or more clusters of metadata, each cluster comprising one or more metadata chunks, each metadata chunk being a chunk of metadata that originated from a single data source, each metadata chunk within a cluster being from a data source different from the data sources from which the other metadata chunks within that cluster originate, the apparatus comprising:
    one or more processors; and
    a graphical user interface operatively connected to the one or more processors;
    wherein the one or more processors are configured to:
      determine mappings between the metadata clusters and one or more of the metadata chunks, wherein the metadata is programmatic metadata relating to episodes of television shows, wherein the metadata clusters include the metadata relating to a specific one of the television shows, and wherein the metadata chunks make up portions of the metadata cluster that can originate from different media sources;
      display, using the graphical user interface, the determined mappings;
      receive an input from a human operator; and
      depending on the input, edit a mapping between one or more metadata chunks and one or more of the metadata clusters such that an inconsistency in the correlated metadata is removed;
    wherein an inconsistency comprises is:
      an incorrect mapping of a metadata chunk to a metadata cluster;
      a mapping of more than one metadata chunk originating from the same data source to the same metadata cluster;
      one or more of the metadata chunks not being mapped to a metadata cluster, and
    wherein when the user detects that one or more of the metadata chunks have not been mapped to a metadata cluster, the editing comprises moving, by the human operator, a digital representation of the metadata chunk that has not been mapped to a metadata cluster from a position on the graphical user interface that corresponds to not being mapped to a metadata cluster to a position on the graphical user interface that corresponds to being mapped to a metadata cluster;
    receive further metadata from a further data source, the further metadata relating to the same multimedia content as the correlated metadata;
    divide the metadata from the further source into one or more chunks of that metadata; and
    perform an alignment process to align the metadata chunks that originated from the further data source with the correlated metadata having the detected inconsistency removed, thereby correlating the further metadata and the correlated metadata having the detected inconsistency removed.

12. Apparatus according to claim 11:
    wherein the determined mappings are displayed such that a human operator may either:
      detect an incorrect mapping of a metadata chunk to a metadata cluster; or
      detect the mapping of more than one metadata chunk originating from the same data source to the same metadata cluster, thereby detecting an inconsistency in the correlated metadata; or
      detect that one or more of the metadata chunks has not been mapped to a metadata cluster, thereby detecting an inconsistency in the correlated metadata; and
    wherein the input comprises data relating to the human operator performing an action, the action being to remove the detected inconsistency.

13. Apparatus according to claim 12 wherein, if the user detects an incorrect mapping of a metadata chunk to a metadata cluster, then the action to remove the detected inconsistency comprises correcting, by the human operator, the incorrect mapping.

14. Apparatus according to claim 12:
  wherein when the user detects the mapping of more than one metadata chunk originating from the same data source to the same metadata cluster, the action to remove the detected inconsistency comprises moving, by the human operator, a digital representation of a metadata chunk from a first position on the graphical user interface to a second position on the graphical user interface;
  wherein the first position is such that an element positioned at the first position is mapped to the metadata cluster to which more than one of the metadata chunks were mapped; and
  wherein the second position is such that an element positioned at the second position is mapped a different metadata cluster to the metadata cluster to which more than one of the metadata chunks were mapped.

15. A method of processing correlated metadata, the correlated metadata comprising a set of one or more clusters of metadata, each cluster comprising one or more metadata chunks, each metadata chunk being a chunk of metadata that originated from a single data source, each metadata chunk within a cluster being from a data source different from the data sources from which the other metadata chunks within that cluster originate, the method comprising:
  determining, by one or more processors, mappings between the metadata clusters and one or more of the metadata chunks, wherein the metadata is programmatic metadata relating to episodes of television shows, wherein metadata clusters include the metadata relating to a specific one of the television shows, and wherein the metadata chunks make up portions of the metadata cluster that can originate from different media sources;
  the determining comprises:
    detecting, by the one or more processors, an incorrect mapping of a metadata chunk to a metadata cluster;
    detecting, by the one or more processors, the mapping of more than one metadata chunk originating from the same data source to the same metadata cluster, thereby detecting an inconsistency in the correlated metadata; and
    detecting, by the one or more processors, that one or more of the metadata chunks has not been mapped to a metadata cluster, thereby detecting an inconsistency in the correlated metadata; and
  editing, by the one or more processors, a mapping between one or more metadata chunks and one or more of the metadata clusters so as to remove the detected inconsistency,
  wherein when the user detects that one or more of the metadata chunks have not been mapped to a metadata cluster, the editing comprises moving, by the human operator, a digital representation of the metadata chunk that has not been mapped to a metadata cluster from a position on the graphical user interface that corresponds to not being mapped to a metadata cluster to a position on the graphical user interface that corresponds to being mapped to a metadata cluster;
  receiving, by the one or more processors, further metadata from a further data source, the further metadata relating to the same multimedia content as the correlated metadata;
  dividing, by the one or more processors, the metadata from the further source into one or more chunks of that metadata; and
  performing, by the one or more processors, an alignment process to align the metadata chunks that originated from the further data source with the correlated metadata having the detected inconsistency removed, thereby correlating the further metadata and the correlated metadata having the detected inconsistency removed.

* * * * *